Nov. 11, 1947.  F. W. SEITZ  2,430,650
SLIP RESPONSIVE FIELD SWITCHING SYSTEM FOR REVERSIBLE SYNCHRONOUS MOTORS
Filed Aug. 27, 1945
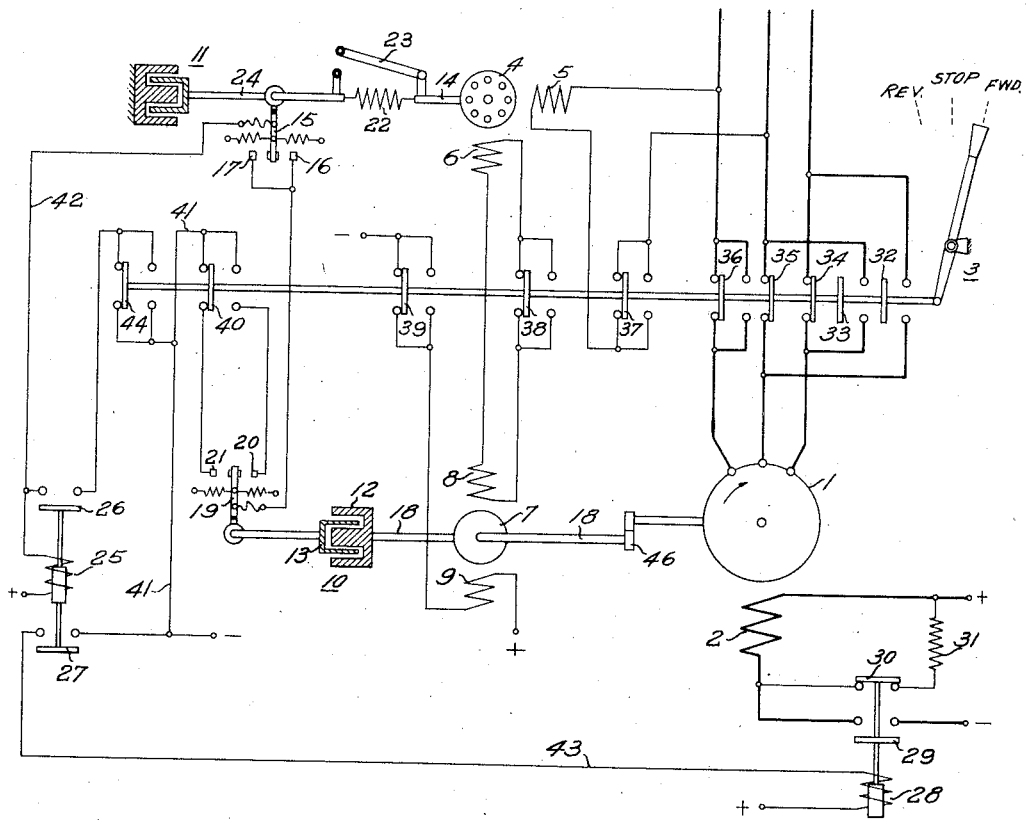
Inventor
Friedrich W. Seitz
by Harold A. Silver
Attorney Patented Nov. 11, 1947

2,430,650

UNITED STATES PATENT OFFICE 2,430,650

SLIP RESPONSIVE FIELD SWITCHING SYSTEM FOR REVERSIBLE SYNCHRONOUS MOTORS

Friedrich W. Seitz, Granville, Wis., assignor to Allis-Chalmers Manufacturing Company, Milwaukee, Wis., a corporation of Delaware Application August 27, 1945, Serial No. 612,826

9 Claims. (Cl. 172—289)

1

This invention relates in general to control systems for synchronous machines and particularly to systems for controlling the application of field excitation to a synchronous machine when it is operating subsynchronously.

Prior art control systems of the above type have utilized electromagnetic relays for controlling the application of field excitation to a synchronous machine operating subsynchronously. Such relays have operated satisfactorily on the usual 60 cycle current but have not been properly accurate when a synchronous machine is energized by lower frequency currents of the order of 10 cycles per second. Prior art electromagnetic field application relay controls have lacked simple and easy adjustment as to the proper point in the slip cycle at which the field is applied. Prior art electromagnetic control systems involving solenoids and plungers have had the disadvantage of false operation when used under physical conditions such as the rolling and pitching conditions found on shipboard.

It is therefore an object of the present invention to provide an improved synchronous machine control system that will avoid the above disadvantages.

It is also an object of the present invention to provide an improved synchronous machine control system that is both rugged and accurate in operation.

It is also an object of the present invention to provide an improved synchronous machine control system in which the control elements are easily adjustable to accurately apply field excitation to the synchronous machine at the desired point in the slip cycle.

It is also an object of the present invention to provide an improved synchronous machine control system that will operate satisfactorily for applying field excitation to a synchronous machine such as may be utilized in ship propulsion systems in which the machine may be quickly reversed in direction of rotation.

Objects and advantages other than those above set forth will be apparent from the following description when read in connection with the drawing in which the single figure is a diagrammatic showing of a control system embodying the present invention.

In the drawing, a synchronous machine 1 is shown connected to a polyphase alternating current source through a reversing switch 3, so that the machine 1 may be rotated in either direction. The machine 1 has a field winding 2 normally energized from a direct current source when the machine 1 is operating synchronously.

Synchronous machines of the above type may be used in ship propulsion systems where the normal frequency of the alternating current source may be as low as 10 cycles per second. The direction of rotation of the machine 1 may be quickly changed from the forward or arrow direction to the reverse direction by movement of the reversing switch 3 to the reverse position while the machine is still rotating in the forward direction. If the control system for applying the excitation of field winding 2 were responsive merely to slip frequency, the field winding 2 might improperly be reconnected immediately upon reversal of the reversing switch 3, although the machine 1 would be rotating in the forward direction. This operation would be undesirable for the machine 1 would possibly pull into step in the wrong direction or at least improper acceleration in the right direction of rotation would be provided if the excitation of field winding 2 were applied before the proper time.

In order to provide proper acceleration and an application of the field excitation at the proper time, a torque motor 4 is provided having a winding 5 energized from one phase of the alternating current source connected to the machine 1. The torque motor 4 also has a winding 6 energized from a winding 8 of a pilot alternator 7 having a shaft 18 connected by gears 46 to the machine 1 so as to rotate at a speed proportional to the machine speed. The gears 46 may provide a 1:1 ratio of speeds, but also provide a simple and easily effected adjustment of the rotational position of shaft 18 to the shaft of machine 1. The output of the alternator 7 at a speed corresponding to synchronous speed of the machine 1, has a frequency the same as that of the alternating current source connected to machine 1.

The pilot alternator 7 has a field winding 9 energized from a direct current source as shown. The windings 5, 6, 8 and 9 are connected through contacts 37, 38 and 39 of the reversing switch 3, so that the circuits of these windings are completed only when the reversing switch 3 is in the forward or reverse direction.

A contactor 19 is connected to the shaft 18 through a suitable electromagnetic driving device 10, which may comprise a permanent magnet 12 and a cup 13 forming an eddy current device operative so that the contactor 19 will close with a contact 21 when the machine 1 is rotating in the forward or arrow direction, and the contact 19 will close with a contact 20 when the machine 1 is rotating in the reverse direction. Springs are provided to return the contactor 19 to the position shown when the machine 1 is stopped.

A contactor 15 is connected to the shaft 14 of the torque motor 4 by means of a spring 22 so that the contactor 15 will close with the contact 17 when the torque motor 4 applies a torque to the shaft 14 in one direction and will close with the contact 16 when the torque motor applies torque to the shaft 14 in the reverse direction. Springs are provided to return the contactor 15 to the position shown when no torque is applied by the torque motor 4 to the shaft 14.

A locking plate 23 is provided for functionally locking out the spring 22 and thereby directly connecting the shafts 14 and 24, so that they rotate as a unit. An electromagnetic device 11, which may be generally similar to the device 10, is provided on the shaft 24 to provide a damping action.

Relay 25 and field switch 28 function when energized to connect the field winding 2 to a direct current source. Relay 25 has an energizing circuit extending from the plus terminal, through relay 25, conductor 42, contactor 15, contact 16 or 17, contactor 19, contact 20 or 21, contacts 40 of the reversing switch 2 and conductor 41 to the negative terminal. Relay 25 has a sealing-in circuit through a back contact 26 and contacts 44 of the reversing switch 3 which shunt the circuit through contacts 15, 16, 17, 19, 20, 21 and 40. Field switch 28 is energized through conductor 43 when the contacts 27 of relay 25 are closed. Energization of field switch 28 opens the circuit through the short circuiting resistance 31, by means of contacts 30. Closure of the contacts 29 closes the circuit connecting the field 2 to the source of direct current.

The control system is shown in the drawing with the various elements thereof in the positions occurring when the reversing switch has been moved to the forward position and the machine is rotating subsynchronously in the forward or arrow direction. The machine 1 is connected by contacts 34, 35 and 36, to the alternating current source and as the contacts 29 of field switch 28 are open, no field excitation is applied to the field winding 2.

The winding 5 of the torque motor 4 is energized through contact 37 from one phase of the alternating current source, and the flux produced by the winding 5 has a frequency equal to that of the alternating current source. The winding 6 of the torque motor 4, energized by an alternating current generated in the winding 8 of the pilot alternator 7, produces a flux in the torque motor 4 having a frequency less than the frequency of the flux wave from winding 5 and having an amplitude less than the maximum amplitude obtained when machine 1 is at synchronous speed. When the flux due to the winding 5 is in phase with the flux due to the winding 6, no torque is applied by the torque motor 4 to the shaft 14. When the flux of winding 6 leads the flux of winding 5 by 90 degrees, the torque applied by torque motor 4 to the shaft 5 is a maximum in one direction, and when the flux in winding 6 lags the flux due to winding 5 by 90 degrees, the torque applied by the torque motor 4 to the shaft 14 is a maximum in the opposite direction.

As the machine 1 comes up in speed, the contactor 15 will tend to vibrate or oscillate in accordance with the slip frequency. Due to the damping inherent in the torque motor 4 or to the damping supplied by the device 11, the contactor 15 will not oscillate sufficiently to close with either contact 16 or 17. However, as the slip frequency decreases and the speed of machine 1 increases so that the amplitude of the voltage generated by the winding 8 increases, the oscillations of contactor 15 will become slower and also greater in extent. At a predetermined slip frequency, normally about three cycles per second, contactor 15 will close with either contact 16 or 17. If the contactor 19 has been closed in the proper direction relative to contacts 40 of the reversing switch 3, a circuit will be completed from the positive terminal, relay 25, conductor 42, contactor 15, contact 16 or 17, contactor 19, contact 21, contacts 40, conductor 41 to the negative terminal, thereby picking up relay 25. Relay 25 seals itself in through contacts 26 and 44. Energization of relay 25 closes the energizing circuit for field switch 28 and energization is thereby applied to field winding 2 and the circuit through resistance 31 is opened.

The contactor 19 prevents improper operation due to the fact that the switch 3 may be moved directly from the reverse position to the forward position. In such case, the slip frequency may be sufficiently low so that the contactor 15 may immediately make contact with contact 16 or 17 when the machine 1 is still rotating in the reverse direction. Until the machine 1 has come to a stop and started in the forward direction, contactor 19 will not close with the proper contact 21. Contacts 40 on the reversing switch provide the interlock so that the relay 25 cannot be picked up unless the machine 1 is rotating in the proper direction corresponding to the position of the reversing switch 3.

By utilizing elements such as torque motor 4 and pilot alternator 5 to operate the contactors 15 and 19, a very rugged yet accurate control system is obtained. By avoiding solenoids and plungers to operate such contactors, the system is not sensitive to physical conditions such as the rolling and pitching found on shipboard. The desired point in the slip cycle at which the field 2 is applied can be easily adjusted for a selected polarity of the field winding 9 of the pilot alternator 7, by selecting the proper relative positions of the gears 46 connecting the alternator 7 to the machine 1, or in any similar suitable manner for changing the angular relation of the machine shaft and the shaft 18.

The slip frequency at which contact 15 will close with contact 16 or 17 is easily and simply adjusted by properly damping the oscillation of the contactor 15. Adjustment in a given range can be made by varying the damping action of the damping device 11 in any suitable manner, as, for example, by varying the operative depth of the cup in the magnet. The range of adjustment can be varied by use of the locking plate 23, whereby the damping action provided by the spring 22 is precluded. The plate 23 may be used to lock out the spring 22 when it is desired to have the contactor 15 close at a relatively low value of slip frequency.

Although but one embodiment of the present invention has been illustrated and described it will be apparent to those skilled in the art that various changes and modifications may be made therein without departing from the spirit of the invention or from the scope of the appended claims.

It is claimed and desired to secure by Letters Patent:

1. In combination, a synchronous machine connected to a source of alternating current, a field winding for said machine, a source of excitation current for said field winding, a field switch for connecting said source of excitation current to said field winding, a generator driven by said machine, and means comprising a contact actuated by a torque motor having a rotatably mounted armature operatively responsive to a predetermined relationship of the phase, amplitude and frequency of the voltage of said generator to the phase, amplitude and frequency of the voltage of said source of alternating current for effecting closure of said field switch.

2. In combinaton, a synchronous machine, a reversing switch provided with a position for connecting said machine to a source of alternating current for rotation in one direction and provided with a second position for connecting said machine to said source of alternating current for rotation in the opposite direction, a field winding for said machine, a source of excitation current for said field winding, a field switch for connecting said source of said excitation current to said field winding, an alternating current generator driven by said machine, means operatively responsive to the position of said reversing switch and to the direction of rotation of said machine for preparing a circuit, and means responsive to a predetermined relationship of the voltage of said generator and the voltage of said source of alternating current for completing said circuit to effect closure of said field switch.

3. In combination, a synchronous machine connected to a source of alternating current, a field winding for said machine, a source of excitation current for said field winding, a field switch for connecting said source of said excitation current to said field winding, a generator driven by said machine, a torque motor provided with a winding responsive to the voltage of said generator and provided with a second winding responsive to the voltage of said source of alternating current, and means responsive to the amplitude of oscillations of said torque motor for effecting closure of said field switch.

4. In combination, a synchronous machine connected to a source of alternating current, a field winding for said machine, a source of excitation current for said field winding, a field switch for connecting said source of said excitation current to said field winding, a generator driven by said machine, a torque motor provided with a winding responsive to the voltage of said generator and provided with a second winding responsive to the voltage of said source of alternating current, and means jointly responsive to the amplitude of oscillations of said torque motor and to the direction of rotation of said machine for effecting closure of said field switch.

5. In combination, a synchronous machine, a reversing switch for reversibly connecting said machine to a source of alternating current, a field winding for said machine, a source of excitation current for said field winding, a field switch for connecting said source of said excitation current to said field winding, a generator driven by said machine, means operatively responsive to the position of said reversing switch and to the direction of rotation of said machine for preparing a circuit for controlling operation of said field switch, a torque motor provided with a winding operatively responsive to the voltage of said generator and provided with a second winding operatively responsive to the voltage of said source of alternating current, and contact means operable upon a predetermined amplitude of oscillation of said torque motor for completing said circuit to effect closure of said field switch.

6. In combination, a synchronous machine connected to a source of alternating current, a field winding for said machine, a source of excitation current for said field winding, a field switch for connecting said source of said excitation current to said field winding, a generator driven by said machine, a torque motor provided with a winding responsive to the voltage of said generator and provided with a second winding responsive to the voltage of said source of alternating current, means responsive to the amplitude of oscillations of said torque motor for effecting closure of said field switch, and means for damping said oscillations of said torque motor.

7. In combination, a synchronous machine connected to a source of alternating current, a field winding for said machine, a source of excitation current for said field winding, a field switch for connecting said source of said excitation current to said field winding, a generator driven by said machine, a torque motor provided with a winding responsive to the voltage of said generator and provided with a second winding responsive to the voltage of said source of alternating current, means jointly responsive to the amplitude of oscillations of said torque motor and to the direction of rotation of said machine for effecting closure of said field switch, and means for damping said oscillations of said torque motor.

8. In a control for a system for comprising a synchronous machine, a source of alternating current, a reversing switch having a position for connecting said machine to said source for rotation in one direction and another position for connecting said machine to said source for rotation in the other direction, a field winding for said machine, a source of excitation current for said field winding and an alternating current generator driven by said machine, the combination of a field switch for connecting said source of excitation current to said field winding, and means for controlling the closing operation of said field switch comprising means responsive to the position of said reversing switch, means responsive to the direction of rotation of said machine, means responsive to a predetermined relationship between the voltages of said generator and of said source of alternating current, and damping means acting on said voltage responsive means.

9. In a control for a system comprising a synchronous machine connected to a source of alternating current, an alternating current generator driven by said machine, a field winding for said machine and a source of excitation current for said machine, the combination of a field switch having a closing coil for connecting said source of excitation current to said field winding, and means for controlling the closing operation of said field switch comprising a torque motor provided with a winding connected with said source of alternating current, another winding connected with said generator and a rotatably mounted armature actuable in response to the joint action of said windings, a switching device for controlling the energization of said closing coil, a resilient coupling between said armature and said switching device, and a damping device connected with said switching device.

FRIEDRICH W. SEITZ.

REFERENCES CITED

The following references are of record in the file of this patent:

UNITED STATES PATENTS

| Number | Name | Date |
|---|---|---|
| 1,481,881 | Prince | Jan. 29, 1924 |
| 2,241,808 | Dawson | May 13, 1941 |
| 2,249,821 | Gulliksen | July 22, 1941 |
| 2,278,179 | Lauder | Mar. 31, 1942 |